E. COOK.
DRAFT EQUALIZER.
APPLICATION FILED MAY 12, 1908.
925,461.
Patented June 22, 1909.
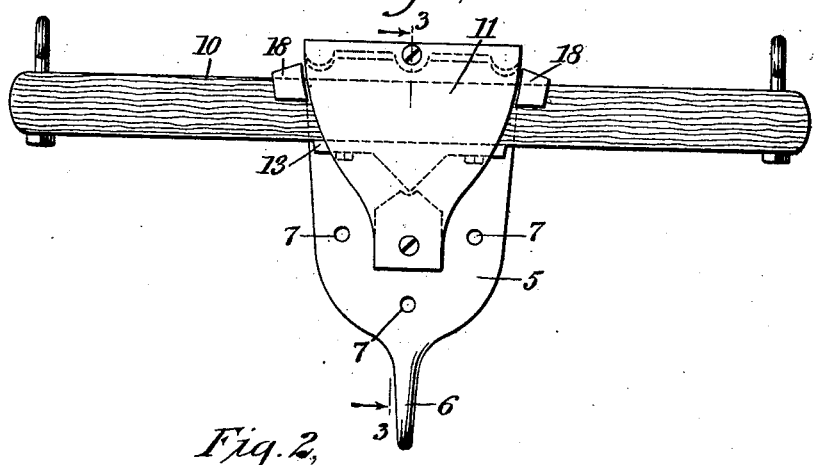
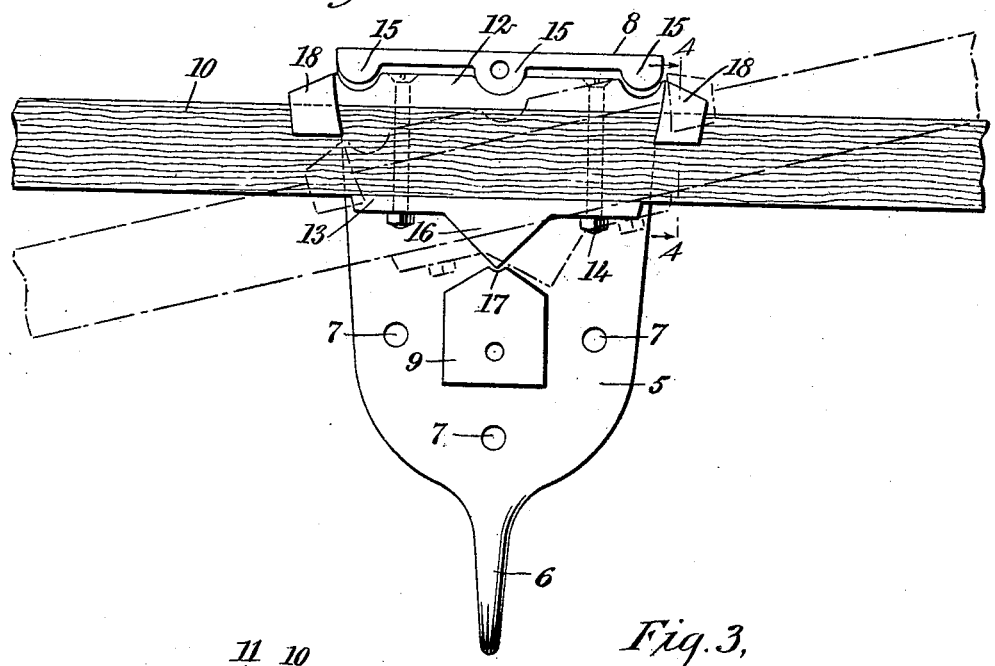
WITNESSES
Edward Thorpe
H. W. Holt
INVENTOR
Everett Cook
BY Munn & Co.
ATTORNEYS

UNITED STATES PATENT OFFICE.

EVERETT COOK, OF PORTLAND, MAINE.

DRAFT-EQUALIZER.

No. 925,461.          Specification of Letters Patent.          Patented June 22, 1909.

Application filed May 12, 1908. Serial No. 432,378.

*To all whom it may concern:*

Be it known that I, EVERETT COOK, a citizen of the United States, and a resident of Portland, in the county of Cumberland and State of Maine, have invented a new and Improved Draft-Equalizer, of which the following is a full, clear, and exact description.

This invention is an improvement in that class of draft equalizers wherein when one draft animal falls behind another it has a temporary advantage until it has caught up and brought the tree to an equalized position.

The invention has in view a construction of this nature adapted to be detachably connected to vehicles of various characters, plows, etc., and having a double tree adapted to rock on a block, with which it engages at opposite sides when thrown to reverse angular positions, and at the center when moved to an equalized position; the block and tree further having V-shaped or other equivalent engaging stop portions at the rear of the block, and the block preferably having a rearwardly extending hook for detachably applying it to certain forms of appliances.

Reference is to be had to the accompanying drawings forming a part of this specification, in which similar characters of reference indicate corresponding parts in all the views.

Figure 1 is a plan of my improved draft equalizer, showing the double tree in normal equalized position; Fig. 2 is a similar view on an enlarged scale, with the top or retaining plate of the block removed; Fig. 3 is a longitudinal section through the block, substantially on the line 3—3 of Fig. 1, looking in the direction of the arrows; and Fig. 4 is a cross-section on the line 4—4 of Fig. 2, looking in the direction of the arrows.

The preferred form of the invention described more in detail, embodies in its construction a block 5 having a rearwardly extending hook 6 for detachably connecting it to a plow or drag, and bolt holes 7 for securing it to a cart, sled or other vehicle. The front of the block is provided with a straight upwardly-projecting flange 8, integral or otherwise rigid therewith, which, in connection with a lug 9, suitably attached to the longitudinal center of the block, forms a transverse slot in which a double tree 10 is pivotally retained. For retaining the tree against vertical displacement a top or retaining plate 11 is screwed or otherwise secured to the flange 8 and lug 9, this flange and lug being approximately of the same height, which is slightly in excess of the thickness of the tree 10, as clearly shown in Fig. 3, thus permitting of the free rocking movement of the tree.

The tree 10, which is preferably of wood, has metal plates 12 and 13, respectively secured to its front and rear edges by bolts 14, and the front plate 12 is provided with a central notch and a notch at each side thereof, which, as shown, are of substantially semi-circular form and are adapted to engage teeth 15, of like shape, similarly arranged on the flange 8. The plate 13 has a V-shaped cam 16 projecting rearwardly from its center, and the front edge of the lug 9 is similarly shaped to engage with this cam when the tree is swung to reverse inclined positions in engagement with the opposite side teeth 15, and when moved to an equalized position, as when the tree engages with the central tooth 15. In this last position the point of the cam enters a groove 17 in the point of the lug 9, which serves as a bearing therefor when the tree moves rearwardly, as when not under strain. The opposite side edges of the top plate 11 are curved to converge rearwardly and provide bearings for lugs 18, integral with the plate 12, which operate to prevent the double tree from sliding from the block in a longitudinal direction.

In the operation of the equalizer, so long as the draft animals pull equally, the bearing of the tree is on the central tooth 15 only, for the reason that this tooth projects slightly farther rearwardly than the side teeth, as best shown in Fig. 2. When, however, one of the animals pulls harder than the other, the fulcrum of the tree will be shifted to one of the side teeth 15, as shown in dotted outline in Fig. 2, and the movement of the tree to an inclined position will be limited by the contact of the inclined faces of the cam and lug, the latter in effect, itself providing a stationary cam. This shifting of the tree shortens one of the lever arms and lengthens the other, thus giving the animal falling behind a temporary advantage until the double tree is again returned to an equalized position.

Having thus described my invention, I claim as new and desire to secure by Letters Patent:

1. The combination of a block, a tree confined within the block adapted to bear thereon centrally and at opposite sides at the front edge when moved respectively from an equalized to oppositely inclined positions relatively to the block, and approximately V-shaped members respectively carried by the block and by the rear edge of the tree, arranged in opposed positions and adapted to engage at the points when the tree is in an equalized position, and at opposite faces when the tree is moved to reversely inclined positions.

2. A draft equalizer comprising a block having teeth, a lug at the rear of the block, having a cam front edge, and a tree confined between the teeth and lug, having notches on its front edge for engaging with the teeth, and provided with a cam on its rear edge for engaging with the cam front edge of the lug.

3. A draft equalizer comprising a block, a tree mounted to rock on the block, means at the front of the tree for shifting the fulcrum between it and the block when the tree is inclined with respect thereto, and approximately V-shaped cams respectively carried by the tree and block, providing a stop.

4. A draft equalizer comprising a block having a lug rigid therewith provided with a cam front edge, a tree mounted to rock on the block, means at the front of the tree for shifting the fulcrum between the tree and block when the tree is moved to an inclined position, and a cam secured to the rear of the tree adapted to engage the cam front edge of the lug.

5. A draft equalizer comprising a block having a straight flange at its front edge provided with teeth, a tree having notches adapted to engage with said teeth, a lug rigid with the block at the rear of the flange, having a cam front edge, a plate secured to the flange and lug for holding the tree to the block and having rearwardly converging opposite side edges, lugs carried by the tree adapted to engage the said converging edges of the plate, and a cam carried by the tree adapted to engage with the cam front edge of the lug.

In testimony whereof I have signed my name to this specification in the presence of two subscribing witnesses.

EVERETT COOK.

Witnesses:
 GUY H. STURGIS,
 HAROLD H. DOLLEY.